(12) United States Patent
Allen

(10) Patent No.: US 9,522,603 B1
(45) Date of Patent: Dec. 20, 2016

(54) SPRING LOADED BRUSH CARRIER

(71) Applicant: Proterra Inc., Greenville, SC (US)

(72) Inventor: Justin Aaron Allen, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/984,468

(22) Filed: Dec. 30, 2015

(51) Int. Cl.
*H02J 7/00* (2006.01)
*B60L 11/18* (2006.01)

(52) U.S. Cl.
CPC ........ *B60L 11/1816* (2013.01); *B60L 11/1824* (2013.01)

(58) Field of Classification Search
CPC .... Y02T 90/14; Y02T 10/7005; Y02T 90/128; Y02T 10/7088; Y02T 90/163
USPC ......................................... 320/109
See application file for complete search history.

(56) References Cited

U.S. PATENT DOCUMENTS

| | | | |
|---|---|---|---|
| 5,277,285 A * | 1/1994 | Musachio | B60L 9/00 180/2.1 |
| 2010/0039067 A1 * | 2/2010 | Hill | B60L 5/42 320/109 |
| 2015/0314695 A1 * | 11/2015 | McGrath | B60R 16/033 320/109 |

FOREIGN PATENT DOCUMENTS

WO    WO/2014/078456    5/2014

* cited by examiner

*Primary Examiner* — Arun Williams
(74) *Attorney, Agent, or Firm* — Bookoff McAndrews, PLLC

(57) ABSTRACT

A charging station for an electric vehicle may include a charge head configured to engage with the charging blade of the vehicle to transfer power. The charge head may include a housing with a central cavity extending along its longitudinal axis and a plurality of electrode holders. Each electrode holder may include an electrode configured to transform from an extended configuration when the charging blade is not positioned in the central cavity to a retracted configuration when the charging blade is positioned in the central cavity. In its extended configuration, the electrode may extend into the central cavity from a side wall of the housing, and in the retracted configuration, at least a portion of the electrode may retract into the housing. Each electrode may also include a plurality of springs configured to bias the electrode in the extended configuration.

20 Claims, 6 Drawing Sheets

SPRING LOADED BRUSH CARRIER

TECHNICAL FIELD

The current disclosure relates to a spring loaded brush carrier of an electric vehicle charging station.

BACKGROUND

Electric vehicles, such as transit buses, are charged at charging stations. The charging station includes a charge head that automatically engages with a charging interface of the bus to direct electric current to the bus for charging. When the bus is positioned proximate the charging station, the charge head engages with the charging interface of the bus. The charge head includes electrodes that contact with electrodes of the charging interface for current transfer. In some applications, the charge head electrodes are pneumatically actuated to transform from a retracted configuration to an extended configuration to make contact with the bus electrodes. After charging, the charge head electrodes are retracted into the charge head, and the bus is allowed to proceed on its route. Pneumatically activated electrodes on the charge head may increase cost and complexity of the system.

Embodiments of the current disclosure may alleviate some of the problems discussed above and/or other problems in the art. The scope of the current disclosure, however, is defined by the attached claims, and not by the ability to solve any specific problem.

SUMMARY

Embodiments of the present disclosure relate to spring loaded electrodes of a charging station. Each of the embodiments disclosed herein may include one or more of the features described in connection with any of the other disclosed embodiments.

In one embodiment, a charging station for an electric vehicle, is disclosed. The electric vehicle may include a charging blade configured to receive power from the charging station. The charging station may include a charge head configured to engage with the charging blade and transfer electric power to the vehicle. The charge head may include a housing having a longitudinal axis, and a central cavity extending along the longitudinal axis of the housing. The central cavity may be configured to receive the charging blade of the vehicle therein. The charge head may also include a plurality of electrode holders positioned in the housing. Each electrode holder of the plurality of electrode holders may include an electrode configured to transform from an extended configuration when the charging blade is not in the central cavity to a retracted configuration when the charging blade is positioned in the central cavity. In its extended configuration, the electrode may extend into the central cavity from a side wall of the housing, and in the retracted configuration, at least a portion of the electrode in the central cavity may retract into the housing. Each electrode may also include a plurality of springs configured to bias the electrode in the extended configuration.

In another embodiment, a method of charging an electric vehicle at a charging station is disclosed. The electric vehicle may include a charging blade on an external surface, and the charging station may include a charge head with a central cavity extending along a longitudinal axis of the charge head and a plurality of spring-loaded electrodes positioned in the central cavity. The method may include moving the charge head into contact with the external surface of the vehicle, and moving the vehicle with the charge head in contact with the external surface such that the charging blade of the vehicle slides into the central cavity of the charge head. The method may also include sliding at least one electrode of the plurality of electrodes of the charge head against the charging blade, and rotating the at least one electrode about a first axis perpendicular to the longitudinal axis while the electrode is sliding against the charging blade.

In yet another embodiment, a charging system for an electric vehicle is disclosed. The charging system may include an electric vehicle with a charging blade that extends along a longitudinal axis of the vehicle positioned on a roof of the vehicle. The charging system may also include a charging station having a charge head positioned over the roof of the vehicle. The charge head may be configured to automatically descend to contact the charging blade. The charge head may include a housing that extends along the longitudinal axis, and a central cavity that extends through the housing along the longitudinal axis. The central cavity may be configured to receive the charging blade of the vehicle therein. The charge head may also include a plurality of electrode holders positioned in the housing. Each electrode holder of the plurality of electrode holders may include a spring-loaded electrode configured to slide against the sliding blade and rotate about an axis perpendicular to the longitudinal axis while sliding against the charging blade, and a plurality of links rotatably coupled to each other. Each electrode holder may also include a plurality of springs coupled to the plurality of links and the electrode. The plurality of springs may be arranged parallel to each other and each spring of the plurality of springs may be inclined with respect to a second axis perpendicular to the longitudinal axis and the first axis.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes charging brushes of an electric vehicle charging system. While principles of the current disclosure are described with reference to the charging system of an electric bus, it should be understood that the disclosure is not limited thereto. Rather, the systems and methods of the present disclosure may be used in charging systems of any vehicle.

Figure 1:
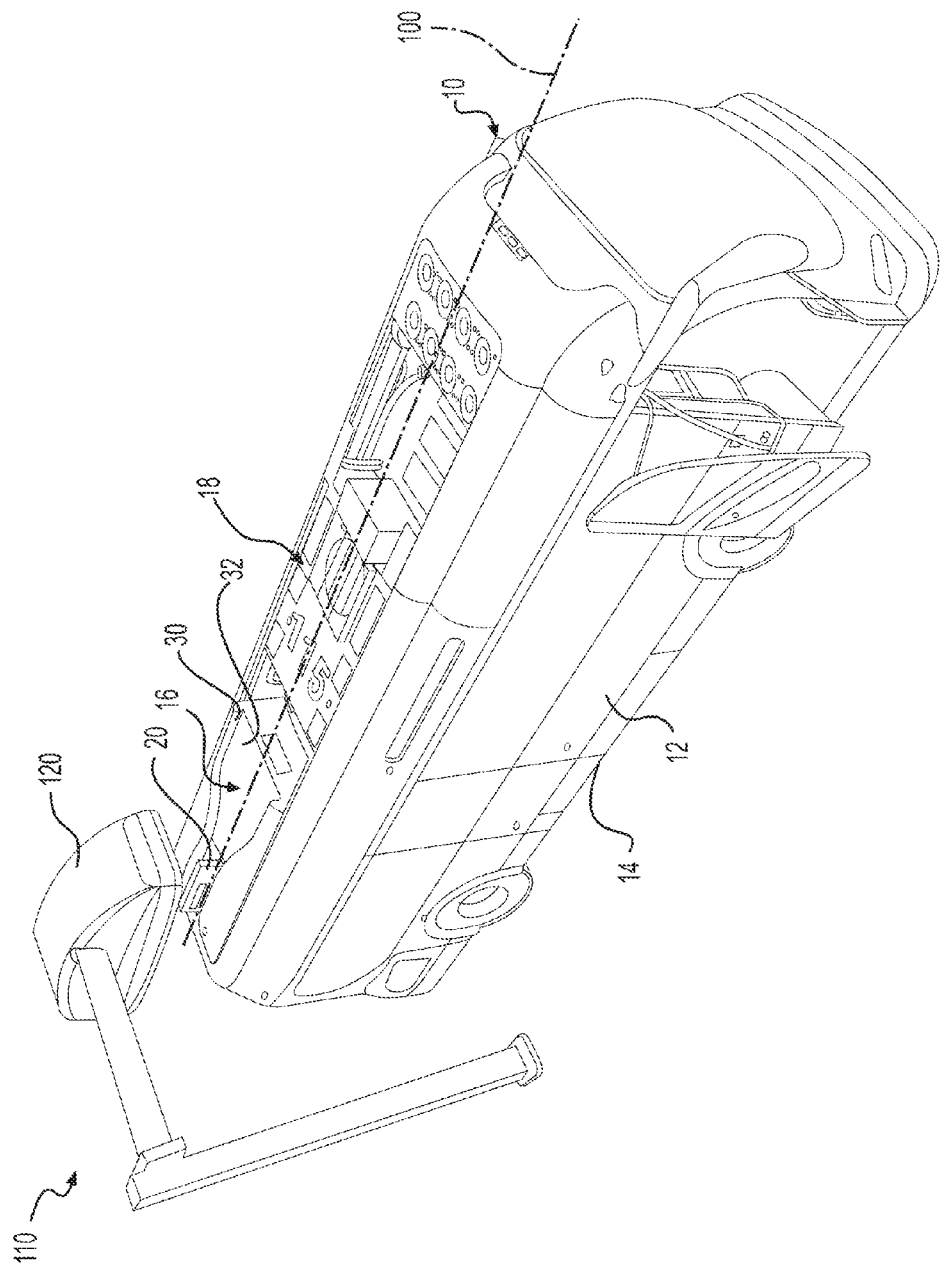
FIG. 1 illustrates an exemplary electric bus of the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of the bus 10. Without limitation, body 12 of bus 10 may have any size, shape, and configuration. In some embodiments, bus 10 may be a low-floor electric bus. As is known in the art, in a low-floor bus, there are no steps at the front and/or the back doors of the bus. In such a bus, the floor of the bus 10 is positioned close to the road surface to ease entry and exit into the bus 10. In some embodiments, the floor height of the low-floor bus may be about 12-16 inches (30.5-40.6 cm) from the road surface. In this disclosure, relative terms, such as, "about," "approximately," "substantially," etc. are used to indicate a possible variation of ±10% in a stated value.

Bus 10 may be propelled by an electric motor. A battery system 14 may store electrical energy to power the motor. In some embodiments, the battery system 14 may be positioned under the floor of the bus 10, and may be configured as a plurality of batteries configured as battery packs. These battery packs may be positioned in cavities (not shown) located under the floor of the bus 10, and may be accessible from below the bus 10. The batteries of battery system 14 may have any chemistry and construction. In some embodiments, the chemistry of the batteries may include lithium titanate oxide (LTO) or nickel manganese cobalt (NMC). In some embodiments, the layout and design of the battery system 14 may enable fast charging of the batteries. By fast charging, the battery system 14 may be recharged (to greater than about 95% state of charge) in less than or equal to about 10 minutes.

Figure 2A:
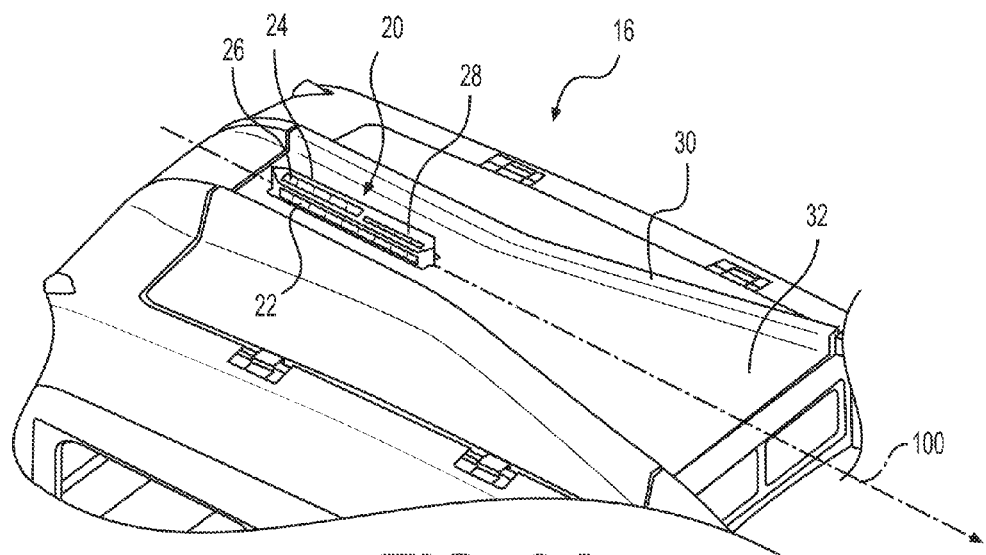
FIG. 2A is an exemplary charging interface of the bus of FIG. 1.

A charging interface 16 may be provided on the roof 18 of the bus 10 to charge the battery system 14. FIG. 2A illustrates an exemplary charging interface 16 of the bus 10. The charging interface 16 may include components that interface with a charge head assembly 120 of an external charging station 110 (see FIG. 1) to charge the battery system 14. These components may include a funnel-shaped alignment scoop 30 comprising a pair of spaced apart rails (wall or other features) extending along a portion of the length of the bus 10. The pair of rails may be positioned in a mirror symmetric manner about a longitudinal axis 100 of the bus 10, and arranged such that the gap between the rails decreases towards the rear of the bus. A charging blade 20 may be positioned between the pair of rails of the alignment scoop 30 in a region where the pair of rails are the closest to each other.

Figure 2B:
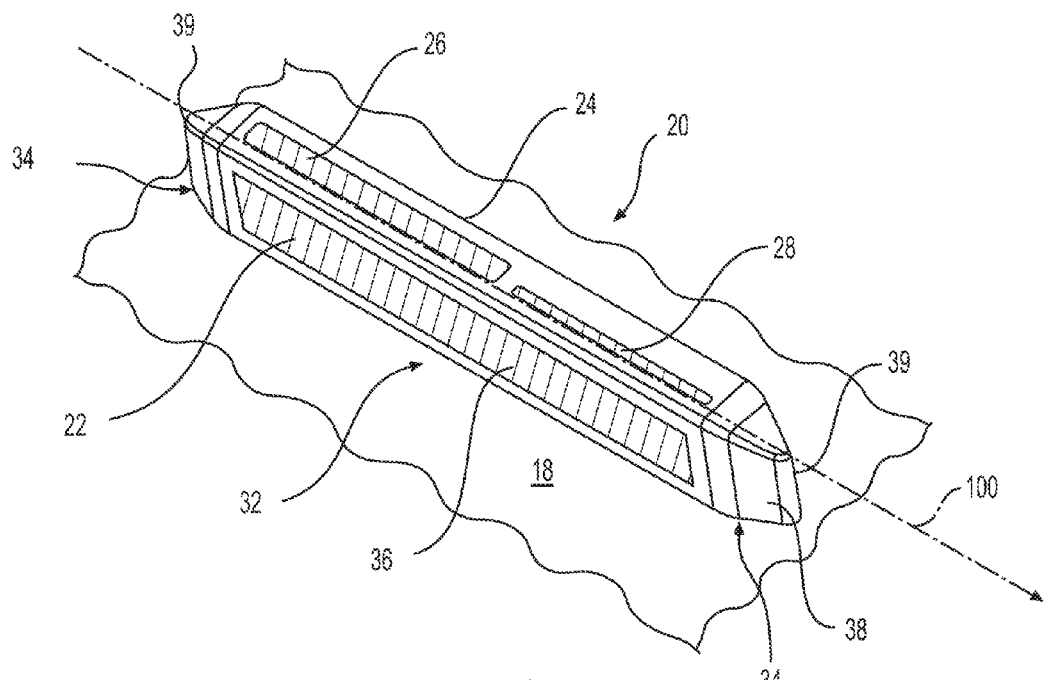
FIG. 2B is an exemplary charging blade of the bus of FIG. 1.

FIG. 2B illustrates an exemplary charging blade 20 of bus 10. The charging blade 20 may protrude vertically upwards from the roof 18 of the bus 10, and include a plurality of electrodes separated from each other by an electrically insulating material. These electrodes may include positive and negative electrodes 22, 24 connected to opposite poles of the batteries of battery system 14, a pilot electrode 26, and a ground electrode 28. The positive and negative electrode 22, 24 may be positioned on opposite side surfaces of the blade 20, and the pilot and ground electrodes 26, 28 may be positioned on the top surface of the blade 20. When the charge head (shown in FIG. 3) of charge head assembly 120 properly engages with charging blade 20, electrical contact between the pilot electrode 26 and a mating electrode on the charge head may trigger a signal (pilot signal) that initiates charging. In some embodiments, charging of the bus 10 may not be initiated unless the pilot signal is detected. The ground electrode 28 of blade 20 may be connected to a common ground of the bus 10.

The charging blade 20 may extend along the longitudinal axis 100 of bus 10, and may include a cuboid section 32 at the middle flanked by triangular prismatic sections 34 at either end. As illustrated in FIG. 2B, the side surfaces 36 of the blade 20 at the cuboid section 32 may extend parallel to each other, and the side surfaces 38 at the prismatic sections 34 may converge towards each other to form tips 39 at the front and rear ends of the blade 20. In some embodiments, these tips 39 may be rounded to avoid a sharp tip. The positive and negative electrodes 22, 24 of blade 20 may be positioned on the side surfaces 36 of the cuboid section 32 of the blade 20. The converging side surfaces 38 at either end of the blade 20 may form guiding features that serve to guide the charge head of the charge head assembly 120 into engagement with the blade 20.

Figure 3:
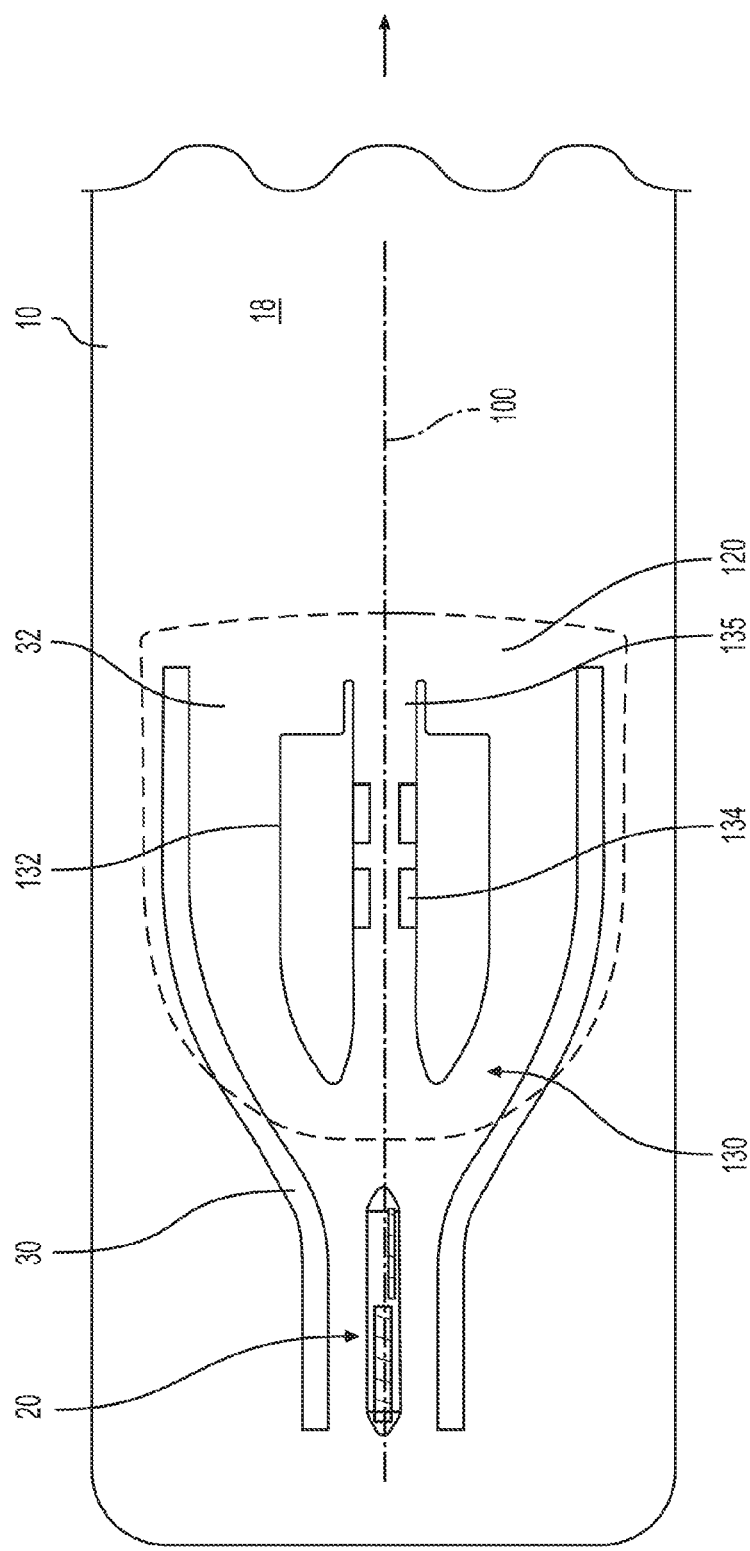
FIG. 3 illustrates an exemplary charge head of a charging station positioned on the charging interface of the bus of FIG. 1.

To charge the bus, when bus 10 is positioned under the charge head assembly 120 of charging station 110, a charge head of the charge head assembly 120 may descend to land on a landing zone 32 (see FIG. 2A) of the charging interface 16. FIG. 3 schematically illustrates the top view of an exemplary charge head 130 resting on the landing zone 32 of the charging interface 16. Commonly-assigned U.S. patent application Ser. No. 14/442,200 (National Stage Application of PCT/US2013/069953 (International Publication No. WO/2014/078456)) filed May 12, 2015, which is incorporated by reference in their entirety herein, describes an exemplary process of lowering the charge head to engage with the charging blade of a bus 10. In FIG. 3, only the outline of the charge head assembly 120 is depicted (using dashed lines) to show the charge head 130. The charge head 130 includes a boat-shaped housing 132 (called boat) that extends along the direction of bus travel (see arrow). The housing 132 includes a central channel 135 extending from one end of the housing 132 to its opposite end. A plurality of electrodes (called brushes 134) may extend into the central channel 135 from the side walls of the housing 132. In general, charge head 130 may include any number of brushes 134. In some embodiments, the charge head 130 may include a total of four brushes 134, with two of these brushes extending from each side of the channel 135. The brushes 134 may have any size and shape. In general, the size and number of brushes 134 may be dictated by their current carrying requirement. In some embodiments, the brushes 134 may be sized such that two of the brushes 134 (e.g., one on each side) are capable of carrying the entire current needed to charge the bus 10. In such an embodiment, the remaining two brushes 134 (of the four total brushes) may provide redundancy to the system. In some embodiments, brushes 134 may be formed with fibers or wires.

Figure 4:
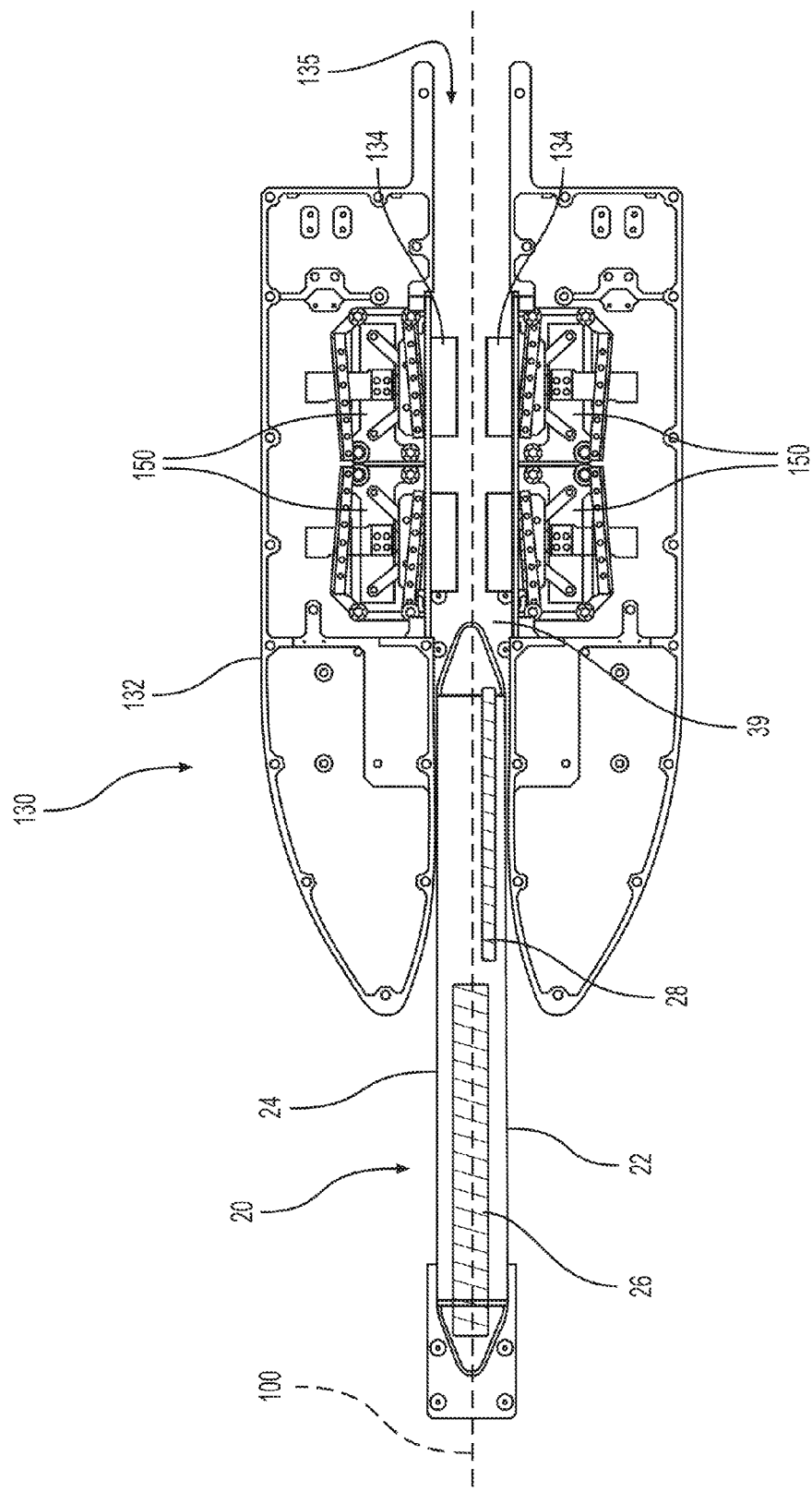
FIG. 4 illustrates the charge head engaging with the charge blade of the bus of FIG. 1.

To engage the charge head 130 with the charging blade 20, with the charge head 130 resting on the landing zone 32 (as depicted in FIG. 3), the bus 10 is moved forward (in the direction of arrow). As the bus 10 moves forward, the charge head 130 slides on the charging interface 16 towards the charging blade 20. The rails of the alignment scoop 30 on either side of the charge head 130 aligns and directs the charge head 130 towards the blade 20. When the charge head 130 reaches the blade 20, the blade 20 enters the central channel 135 of the charge head 130. FIG. 4 is an illustration of the charge head 130 with the blade 20 in its central channel 135. The rounded tip 39 formed at the end of the blade 20, and the wider opening of the channel 135 at its leading end assists in directing the blade 20 into the channel 135. As the external surfaces of the blade 20 interact with (or pushes against) the side walls of the central channel 135, the charge head 130 may be rotate slightly (about a vertical axis through the plane of the paper), such that the central channel 135 is aligned with the longitudinal axis 100, so that the blade 20 can enter the central channel 135. As the bus 10 continues to move forward, the brushes 134 of the charge head 130 make contact with the positive and negative electrodes 22, 24 of the charging blade 20. The charge head 130 may also include electrodes (not shown) that make contract with the pilot electrode 26 and ground electrode 28 of blade 20. Signals (e.g., pilot signal) between the charging station 110 and the bus 10 indicate when suitable contact between the brushes 134 and the bus electrodes (22, 24, 26, and 28) is achieved. When the pilot signal is received, the bus 10 may be stopped and charging initiated.

The conductive brushes 134 of the charge head 130 may be spring-loaded electrodes that are biased to remain in an extended configuration. When the blade 20 squeezes through the gap between the brushes 134 (in the central channel 135), the brushes 134 are pushed into the housing 132 against the force of the springs to apply contact force on the electrodes 22, 24 of the blade 20. This contact force improves electrical contact between the bus 10 and the charge head 130 and reduces contact resistance. Reducing contact resistance improves current transfer and reduces heating. The charge head housing 132 may house spring-loaded brush carriers 150 that support the brushes 134. As the blade 20 first makes contact with the brushes 134 and slides against the brushes 134 (as the bus 10 continues to move forward), the tip 39 and the inclined side surfaces 38 of the blade 20, in turn, make contact with the brushes 134. The brush carriers 150 may minimize point loading of the brush surface as the blade 20 engages and disengages with the brushes 134 by rotating the brushes 134 to remain parallel to the blade surface, that is in contact with the brushes 134, as the blade 20 is dragged against the brushes 134. Keeping the brushes 134 parallel to the blade surface during contact makes the force across the brush surface relatively uniform and assists in even brush wear.

Figure 5A:
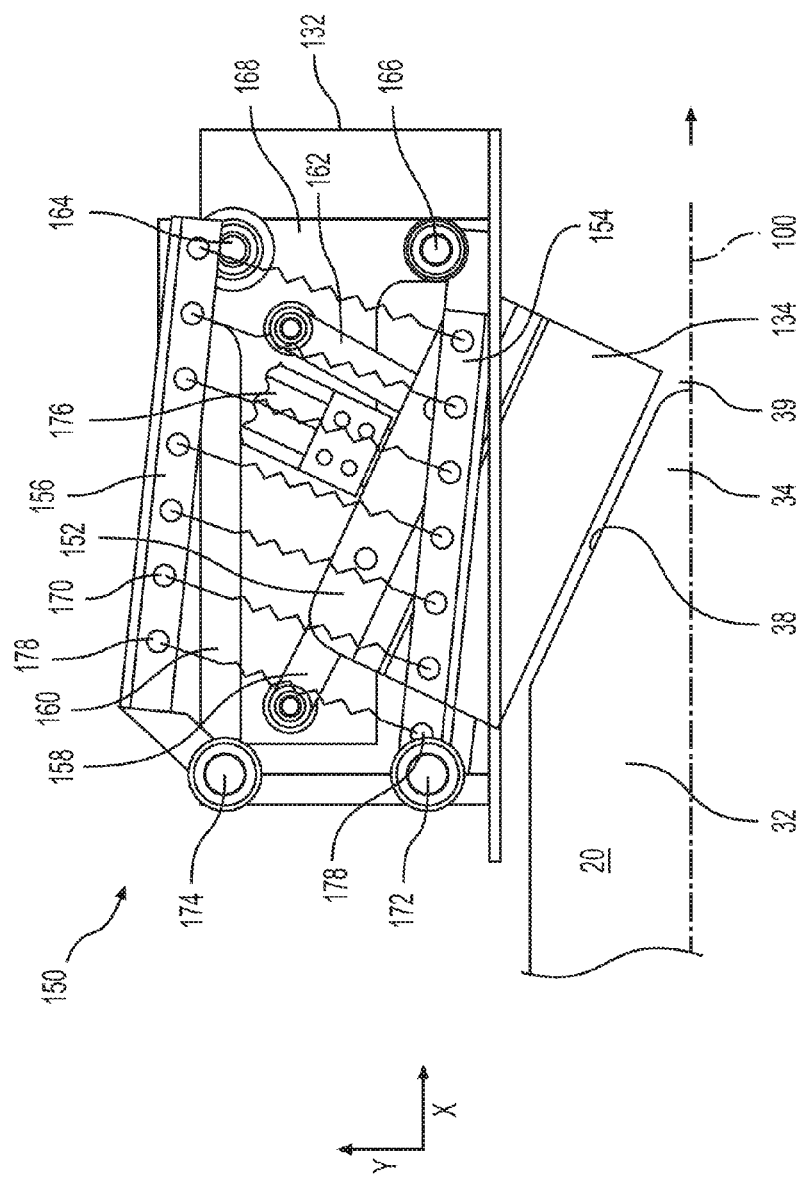
FIG. 5A illustrates an exemplary brush of the charge head in contact with a first surface of the charge blade.
Figure 5B:
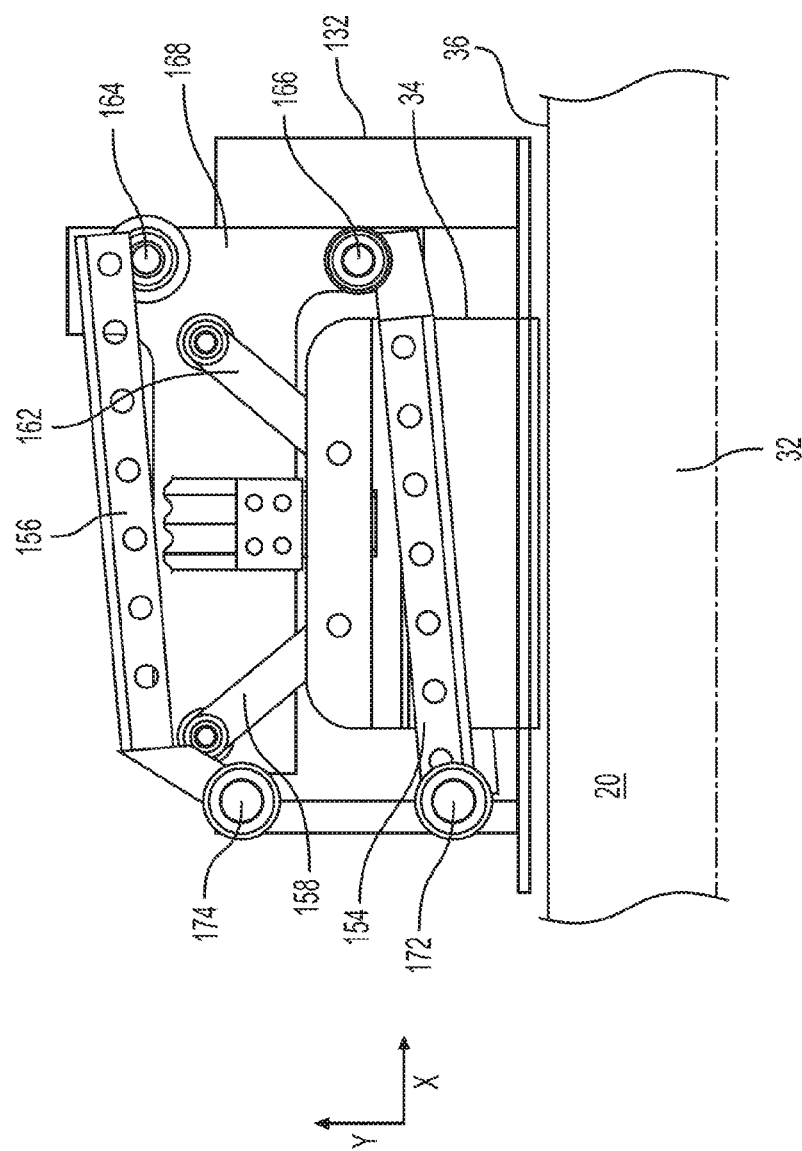
FIG. 5B illustrates the exemplary brush of FIG. 5A in contact with a second surface of the charge blade.

FIGS. 5A and 5B illustrate an exemplary brush carrier 150 that supports a brush 134. FIG. 5A is an illustration of the brush carrier 150 when the brush 134 is in contact with an inclined side surface 38 of the prismatic section 34 of the blade 20, and FIG. 5B illustrates the brush carrier 150 when the brush 134 interfaces with a side surface 36 of the cuboidal section 32 of the blade 20. In the discussion that follows, reference will be made to both FIGS. 5A and 5B. Brush holder 150 includes a four link assembly made up of a leading link 154, a trailing link 156, a first link 158, and a second link 162 (see FIG. 5B). First and second links 158 and 162 may be used to constrain brush rotation about a virtual pivot. The leading link 154 and the trailing link 156 each include a plurality of openings 170 spaced apart along their lengths. As illustrated in FIG. 5A, springs 160 are connected between the openings 170 of the leading link 154 and the openings 170 of the trailing link 156. The springs 160 are not shown in FIG. 5B for clarity.

The leading link 154 and the trailing link 156 are pivoted at a first end (left end in FIGS. 5A and 5B) at a fixed leading link pivot 172 and a fixed trailing link pivot 174 respectively. Fixed leading and trailing link pivots 172, 174 are fixed locations that allow the first end of the leading link 154 and the trailing link 156 to rotate about these pivots without translation. The opposite second end (right end in FIGS. 5A and 5B) of the leading link 154 and the trailing link 156 are pivoted to a T-shaped brush carrier plate 168 at a moving leading link pivot 166 and a moving trailing link pivot 164 respectively. The brush carrier plate 168 is configured to translate towards and away from the blade 20 (i.e., along the y-axis in FIGS. 5A and 5B) without rotating. Moving leading and trailing link pivots 166, 164 allow the second end of the leading and the trailing link 154, 156 to rotate about these pivot points while translating with the brush carrier plate 168. One end (top end in FIGS. 5A and 5B) of the first and second links 158, 162 are pivoted on the brush carrier plate 168 and their opposite ends (bottom end in FIGS. 5A and 5B) are pivoted on a brush mount 152 which supports the brush 134. A conductor shoe assembly 176, connected to the brush mount 152, provides electric power to the brush 134.

As the brush 134 is pushed inwards (into housing 132) by the blade 20, the leading and trailing links 154, 156 and the first and second links 158, 162 rotate about their respective pivots, and the brush carrier plate 168 translates (in the y direction) to load the springs 160 and provide a net outward force that is applied by the brush 134 on the side surface of the blade 20. When the inclined side surface 38 of the blade 20 contacts an end of the brush 134, that end of the brush 134 is pushed into the housing 132, causing the links to rotate the brush mount 152 to keep the brush surface flush against the inclined side surface 38. Since the openings 170 in the leading and trailing links 158, 156 that support each spring 160 are spaced apart in the x-direction (direction of bus travel as shown by the arrow), a component of the spring force (marked $F_y$ in FIG. 5A) creates a moment which helps to rotate the brush 134 to be substantially flush (or parallel to) against the inclines side surface 38, and thereby apply a substantially even force over the entire inclined side surface 38.

As the brush 134 slides across the side surface 38 of the prismatic section 34 (or the blade 20) to contact the side surface 36 of the cuboid section 32 (see FIG. 5B), the links of the brush carrier 150 and the moments created by the spring force rotate the brush 134 to be substantially parallel to the side surface 36 and apply a substantially even contact force against the blade 20. Rotating the brush 134 surface to be substantially parallel to the blade surface reduces point loads on the brush 134 and assists making brush wear uniform.

While the current disclosure describes using a spring loaded brush carrier in the charging station of a bus, it should be understood that the disclosure is not limited thereto. Rather, the principles of the systems and methods described herein may be employed in any charging system. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:
1. A charging station for an electric vehicle, the electric vehicle including a charging blade configured to receive power from the charging station, comprising:
    a charge head configured to engage with the charging blade and transfer electric power to the vehicle, the charge head including;
        a housing having a longitudinal axis;
        a central cavity extending along the longitudinal axis of the housing, the central cavity being configured to receive the charging blade of the vehicle therein; and a plurality of electrode holders positioned in the housing, each electrode holder of the plurality of electrode holders including:
  an electrode that extends into the central cavity through an opening on a side wall of the housing that forms a boundary wall of the central cavity, the electrode being configured to transform from an extended configuration when the charging blade is not in the central cavity to a retracted configuration when the charging blade is positioned in the central cavity, wherein (a) in the extended configuration, the electrode extends into the central cavity from within the housing through the opening on the side wall of the housing, and (b) in the retracted configuration, at least a portion of the electrode in the central cavity retracts into the housing through the opening on the side wall; and
  a plurality of springs configured to bias the electrode in the extended configuration.

2. The charging station of claim 1, wherein each electrode holder further includes a plurality of links rotatably coupled to each other and connected to the electrode and to the plurality of springs, the plurality of links being configured to rotate the electrode about a first axis perpendicular to the longitudinal axis.

3. The charging station of claim 2, wherein the plurality of links are configured to rotate the electrode about the first axis while the electrode is in contact with the charging blade of the vehicle.

4. The charging station of claim 2, wherein the plurality of springs are connected between two oppositely positioned links of the plurality of links.

5. The charging station of claim 4, wherein the plurality of springs are arranged parallel to each other and each spring of the plurality of springs is inclined with respect to a second axis perpendicular to the longitudinal axis and the first axis.

6. The charging station of claim 1, wherein the plurality of electrode holders are arranged in a mirror-symmetric manner about the longitudinal axis.

7. The charging station of claim 6, wherein the plurality of electrode holders include four electrode holders.

8. The charging station of claim 1, wherein the electrode is an electrically conductive brush.

9. The charging station of claim 1, wherein the charge head is configured to automatically descend to receive the charging blade in the central cavity.

10. The charging station of claim 1, wherein the central cavity extends from one end of the housing to an opposite end of the housing, and the housing is mirror-symmetric about the longitudinal axis.

11. The charging station of claim 1, wherein the central cavity is symmetrically positioned about the longitudinal axis of the housing, and when the charge head engages with the charging blade of the vehicle, the longitudinal axis of the housing is collinear with a longitudinal axis of the vehicle.

12. A method of charging an electric vehicle at a charging station, the electric vehicle including a charging blade on an external surface of the vehicle, and the charging station including a charge head having (a) a housing with a central cavity extending along a longitudinal axis of the charge head, and (b) a plurality of spring-loaded electrodes, wherein each electrode of the plurality of spring loaded electrodes extends from within the housing into the central cavity through an opening on a side wall of the housing that forms a boundary wall of the central cavity, comprising:
  moving the charge head into contact with the external surface of the vehicle;
  sliding the charge head on the external surface such that the charging blade of the vehicle slides into the central cavity of the charge head;
  sliding at least one electrode of the plurality of electrodes of the charge head against the charging blade;
  retracting a portion of the at least one electrode in the central cavity into the housing, through the opening on the side wall, in response to the sliding; and
  rotating the at least one electrode about a first axis perpendicular to the longitudinal axis while the electrode is sliding against the charging blade.

13. The method of claim 12, wherein the electric vehicle is a bus.

14. The method of claim 12, wherein the charge head includes a plurality of links rotatably coupled to each other and a plurality of springs coupled to the plurality of links and the at least one electrode, and wherein rotating the at least one electrode includes moving the plurality of links relative to each other to rotate the at least one electrode.

15. The method of claim 14, wherein the plurality of springs are arranged parallel to each other and each spring of the plurality of springs is inclined with respect to a second axis perpendicular to the longitudinal axis and the first axis, and wherein rotating the at least one electrode includes inducing a moment on the at least one electrode using the plurality of springs.

16. The method of claim 12, wherein the charging blade is positioned on a roof of the vehicle, and moving the charge head includes lowering the charge head to land on the roof of the vehicle.

17. A charging system for an electric vehicle, the electric vehicle including a charging blade that extends along a longitudinal axis of the vehicle, comprising:
  a charging station having a charge head positioned over the roof of the vehicle, wherein the charge head is configured to automatically descend to contact the charging blade, the charge head including:
    a housing that extends along the longitudinal axis;
    a central cavity extending through the housing along the longitudinal axis, the central cavity being configured to receive the charging blade of the vehicle therein; and
    a plurality of electrode holders positioned in the housing, each electrode holder of the plurality of electrode holders including:
      a spring-loaded electrode that extends into the central cavity through an opening on a side wall of the housing that forms a boundary wall of the central cavity, the electrode being configured to slide against the sliding blade and rotate about an axis perpendicular to the longitudinal axis while sliding against the charging blade, wherein the spring-loaded electrode is configured to transform from an extended configuration when the charging blade is not positioned in the central cavity to a retracted configuration when the charging blade is positioned in the central cavity, wherein (a) in the extended configuration, the electrode extends into the central cavity from within the housing through the opening on the side wall of the housing, and (b) in the retracted configuration, at least a portion of the electrode in the central cavity retracts into the housing through the opening on the side wall;
      a plurality of links rotatably coupled to each other; and
      a plurality of springs coupled to the plurality of links and the electrode, wherein the plurality of springs are arranged parallel to each other and each spring of the plurality of springs is inclined with respect to a second axis perpendicular to the longitudinal axis and the first axis.

18. The charging system of claim 17, wherein the plurality of electrode holders are arranged in a mirror-symmetric manner about the longitudinal axis.

19. The charging system of claim 18, wherein the plurality of electrode holders include four electrode holders and the at least one electrode is a conductive brush.

20. The charging system of claim 17, wherein, when the charge head engages with the charging blade, the longitudinal axis of the vehicle is collinear with the longitudinal axis of the housing.

\* \* \* \* \*